(12) United States Patent
Yamaguchi

(10) Patent No.: US 7,099,270 B2
(45) Date of Patent: Aug. 29, 2006

(54) MULTI-PATH EQUALIZATION FOR ORTHOGONAL FREQUENCY DIVISION MULTIPLEXING COMMUNICATION SYSTEM

(75) Inventor: Hirohisa Yamaguchi, Tsukuba (JP)

(73) Assignee: Texas Instruments Incorporated, Dallas, TX (US)

( * ) Notice: Subject to any disclaimer, the term of this patent is extended or adjusted under 35 U.S.C. 154(b) by 919 days.

(21) Appl. No.: 10/162,891

(22) Filed: Jun. 6, 2002

(65) Prior Publication Data
US 2003/0227866 A1  Dec. 11, 2003

(51) Int. Cl.
*H04J 11/00* (2006.01)
(52) U.S. Cl. .................. 370/208; 370/210; 375/340
(58) Field of Classification Search ........... None
See application file for complete search history.

(56) References Cited

U.S. PATENT DOCUMENTS

| | | | |
|---|---|---|---|
| 6,940,914 B1* | 9/2005 | Lo et al. ................ | 375/260 |
| 6,990,153 B1* | 1/2006 | Farhang-Boroujeni et al. ................. | 375/260 |
| 7,023,928 B1* | 4/2006 | Laroia et al. ............ | 375/260 |
| 2001/0015954 A1 | 8/2001 | Kuwabara et al. | |
| 2002/0145971 A1* | 10/2002 | Cho et al. ............... | 370/208 |
| 2002/0181549 A1* | 12/2002 | Linnartz et al. ......... | 375/142 |
| 2003/0128656 A1* | 7/2003 | Scarpa ................... | 370/203 |

FOREIGN PATENT DOCUMENTS

| EP | 0 954 143 A1 | 11/1999 |
|---|---|---|
| EP | 1 209 836 A1 | 5/2002 |

OTHER PUBLICATIONS

"A Novel Channel Estimation Method for OFDM Mobile Communication Systems Based on Pilot Signals and Transform-Domain Processing", Yuping Zhao and Aiping Huang, VTC 1997, pp. 2089-2093.
"DSP-Based OFDM Demodulator and Equalizer for Professional DVB-T Receivers", Fabrizio Frescura, et al., IEEE Trans. Broadcasting, vol. 45, No. 3, Sep. 1999, pp. 323-332.
"Digital Broadcasting for Television, Sound, and Data Services; Framing Structure Channel Coding and Modulation for Digital Terrestrial Television", ETS 300 744, Mar. 1997, pp. 1-48.

* cited by examiner

*Primary Examiner*—Bob A. Phunkulh
(74) *Attorney, Agent, or Firm*—Ronald O. Neerings; Wade James Brady, III; Frederick J. Telecky, Jr.

(57) ABSTRACT

A multi-path equalization system for orthogonal frequency division multiplexing communication (OFDM) system includes a first estimator for estimating the channel characteristic using pilot signal. A divider is coupled to the estimator for dividing each sub-carrier with the channel characteristic to get the equalization to the data signal. A de-mapper uses the phase and amplitude correction of the channel estimate to recover the data signals. An improved channel estimation is provided by a repeat channel estimation feedback loop that includes the de-mapper a multiplier, an inverse fast Fourier transform (IFFT), a low pass filter and a fast Fourier transform (FFT). The improved channel estimation is obtained by multiplying at the multiplier the conjugate of the de-mapped data to the input sub-carriers and applying inverse FFT, low pass filtering and FFT to get the new channel estimate. Each sub-carrier is divided with new channel characteristic to get new equalization to the data signal. The channel estimation is repeated until there is convergence. The output is provided after the de-mapper. In the case of channel decoding to improve performance a Viterbi decoder and convolutional encoder is coupled in loop between the de-mapper and the multiplier.

21 Claims, 6 Drawing Sheets

MULTI-PATH EQUALIZATION FOR ORTHOGONAL FREQUENCY DIVISION MULTIPLEXING COMMUNICATION SYSTEM

FIELD OF INVENTION

This invention relates to orthogonal frequency division multiplexing (OFDM) communication system and more particularly to multi-path equalization of OFDM communication system by iterative channel estimation.

BACKGROUND OF INVENTION

Orthogonal Frequency Division Multiplexing (OFDM) communication system has been adopted as the regional standards for the terrestrial television in Europe (DVB-SI) and Japan (ISDB-T). For DVB-SI for Europe this is described in "Digital Broadcasting Systems for Television, Sound, and Data Services; Framing Structure, Channel Coding and Modulation for Digital Terrestrial Television," ETS 300 744,1997. For ISDB-T for Japan the reference is "Technical Specification of Terrestrial Digital TV Broadcasting," ARIB draft specification, Ver. 0.5, December 2000.

OFDM's spread spectrum technique distributes the data over a large number of sub-carriers that are spread apart at precise frequencies. The spacing provides the "orthogonality" in this technique which prevents the demodulators from seeing other frequencies than their own. The OFDM technique relies on the orthogonality properties of the fast Fourier transform (FFT) and the inverse fast Fourier transform (IFFT) to eliminate interference between carriers. At the transmitter, the precise setting of the carrier frequencies is performed by the IFFT. The data is encoded into constellation points by multiple (one for each carrier) constellation encoders. The complex values of the constellation encoder outputs are the inputs to the IFFT. For wireless transmission, the outputs of the IFFT are converted to an analog waveform, upconverted to a radio frequency, amplified, and transmitted. At the receiver, the reverse process is performed. The received signal is amplified, down converted to a band suitable for analog to digital conversion, digitized, and processed by a FFT to recover the carriers. The multiple carriers are then demodulated in multiple constellation decoders (one for each carrier), recovering the original data. Since an IFFT is used to combine the carriers at the transmitter and a corresponding FFT is used to separate the carriers at the receiver, the process has potentially zero intercarrier interference.

In wireless transmissions, the signal can be reflected or scattered from buildings, vehicles, trees, vegetation, and terrain features. Multiple copies of the signal, each with a different time delay that depends upon the path traveled, are summed at the receive antenna. This phenomenon is referred herein as Multi-path transmission, or more simply multi-path. Multi-path causes fading and attenuation in the frequency band, which if uncompensated causes unacceptably large number of errors in the decoding process. Multi-path interference, called the ghost phenomenon frequency encountered in the vehicular reception of the conventional terrestrial analog TV, should be much eliminated by this OFDM digital modulation and the introduction of the protective guard interval (GI) in the transmission.

Further, to avoid this, carriers with known amplitude and phase are transmitted for the purpose of measuring the wireless transmission channel. These carriers are known as training tones or pilot tones. These pilot tones are inserted periodically in the frequency and time domain in the transmitted OFDM symbol. Since the training tones are known apriori, the response of the wireless channel at the data tone frequencies can be interpolated from known responses at the training tone frequencies. The measured and interpolated channel responses, known as channel estimates, are used in the decoding process.

Conventionally the channel estimate for equalizing the data part of the received OFDM symbol has been achieved by this interpolating of the channel estimate obtained at the pilot signals. The following references discuss conventional channel estimate for equalizing.

1. Yagi, et al, "Development of OFDM Transmission Equipment for Digital Terrestrial Television Broadcasting," ITE Technical Report Vol. 23, No. 34, May 1999.
2. Yamamoto, et al, "A study on Equalization technique for an OFDM System," IEICE Technical Report IE98-91, November 1998.
3. Kisoda, et al. "Development of the OFDM Modem," ITE Technical Report Vol. 21, No.44, August 1997.
4. Shima, et al, "A Study on Improving Characteristics of OFDM Equalizer Using Array Antennas," ITE Annual Convention Mar. 1, 2000.
5. Zhao and Huang, "A Novel Channel Estimation Method of OFDM Mobile Communication Systems Based on Pilot Signals and Transform-Domain Processing," Proceedings VTC 1997, pp 2089–2093.
6. Hossam H'Mimy, "Channel Estimation Based on Coded Pilot for OFDM," Proceedings VTC 1997, pp. 1375–1379.
7. Multi-Carrier Spread Spectrum, pp. 169–178, Kluwar Academic Press. 1997.
8. Frescura, et al, "DSP-based OFDM Demodulator and Equalizer for Professional DVB-T Receivers," IEEE Trans. Broadcasting, Vol. 45, No. 3, September 1999.

However, when the signal to noise ratio, called carrier to noise ratio in the following drops near to 0 dB, for instance in the shadow of the building or indoors, a good channel estimate becomes difficult due to the disruption of the pilot signals themselves.

SUMMARY OF INVENTION

In accordance with one embodiment of the present invention an improved multi-path equalization in OFDM systems is provided by first estimating the channel characteristic using pilot signals. Each sub-carrier is divided by the channel characteristic to get the equalization of the data signal. A de-map processing uses the phase and amplitude correction of the channel estimate to recover the data signals. The channel estimation is repeated using conjugate of the data signal obtained using the previous channel estimate. After each estimate each sub-carrier is divided with the new channel characteristic to get the equalization to the data signal; and there is de-map processing to recover the data signals.

DESCRIPTION OF PREFERRED EMBODIMENTS OF THE PRESENT INVENTION

The structure of a conventional OFDM receiver for DVB-SI and ISDB-T is similar, and the inclusion of the pilot signals within the whole symbol is common with the ODFM receiver in general.

In ODFM, data bits are mapped on a group of sub-carriers in the frequency domain. Let the modulated data (4/16/64 QAM, DQPSK, etc.) be represented as $$c(k)=c_1(k)+jc_2(k) \quad (1)$$

where c(k) corresponds to the data mapped in the signal space, the transmitted ODFM signal in the time domain is represented as (ISDB-T Mode 1)

$$T(t) = \text{real}\left(\sum_{k=0}^{1403} (c1(k) + jc2(k)) \exp(j2\pi(k-702)t/2048)\right) \quad (2)$$

Figure 1:
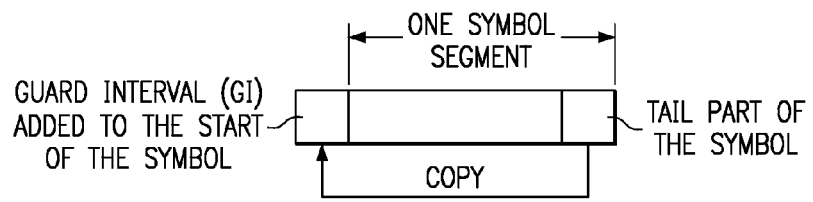
FIG. 1 illustrates the structure of the transmitted ODFM signal.
Figure 2:
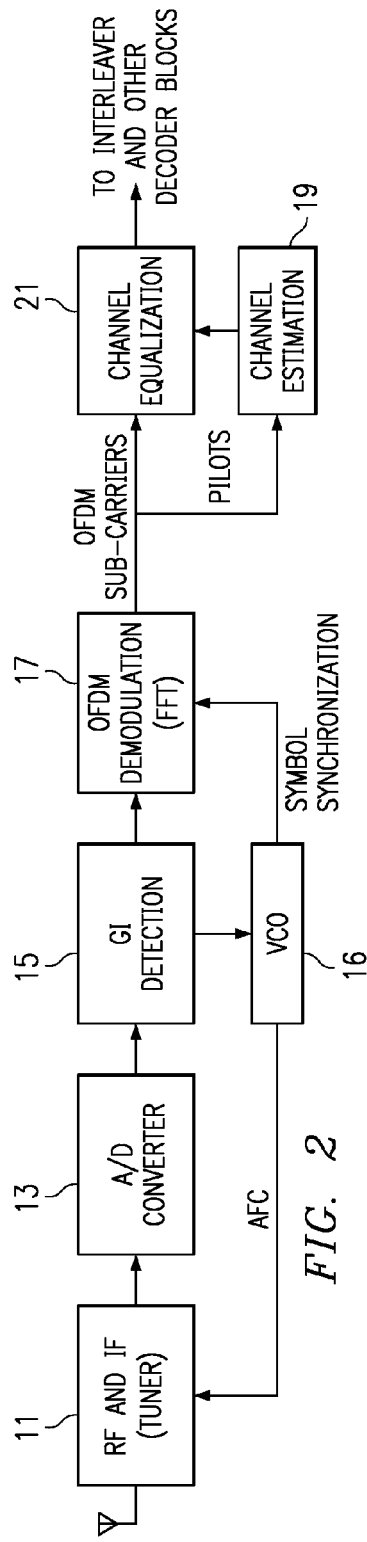
FIG. 2 is a simplified block diagram of a conventional ODFM receiver.

The symbol length of this signal is 252 μsec and to this, the protective guard interval (GI) is added by copying the tail part of the symbol as shown in FIG. 1. The length of GI is chosen to be ¼, ⅛, ¹⁄₁₆ or ¹⁄₃₂ of the depending on the channel condition. The general structure of the OFDM receiver is shown in FIG. 2. The detection of the start position of the symbol is effected by taking advantage of the repeated GI signal; by sliding the matching window of the GI length at all time. The symbol detection also generates the synchronized local clock for sampling the received signal. The GI detection 15 controls the voltage controlled oscillator (VCO) 1 which controls the tuner front end (AFC control) 11 and provides the symbol synchronization at the FFT demodulator 17. The signal structure defined by equation 2 requires 2048-point FFT to recover the 1404 sub-carriers and the A/D sampling clock is adjusted (AFC) to the required signal sampling speed.

Figure 3:
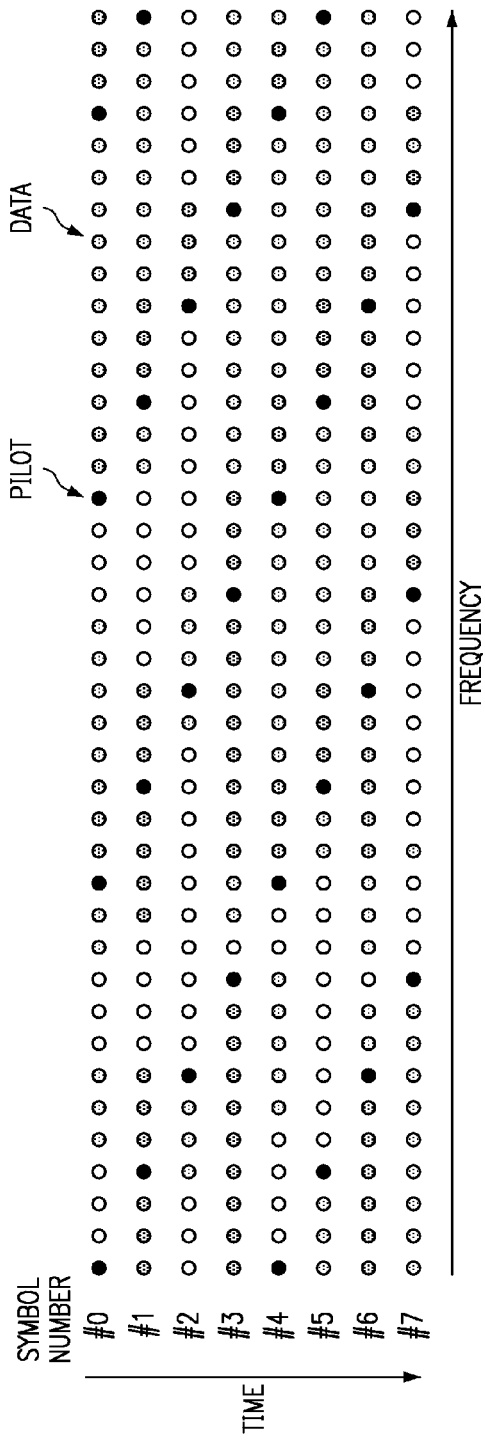
FIG. 3 illustrates the structure of the scattered pilots included in the OFDM symbols.

After the tuner front end (RF and IF) 11 and the analog-to-digital (A/D) conversion 13, the start of the OFDM symbol is identified and the subsequent symbol segment is transformed into 1404 sub-carriers using 2048-FFT 17. For the channel estimation, pilot signals are inserted in each ODFM symbol as shown in FIG. 3. As shown, every 12th subcarrier is modulated by the pilot signal (ISDB-T Mode 1). The pilot sub-carrier position is shifted in time by three sub-carries (ISDB-T Mode 1), so the pattern repeats itself every four symbols. These pilots, often called the scattered pilots, are a pseudo random binary sequence. The data are mapped on the rest of the sub-carriers. The data signal undergoes a phase rotation and an amplitude distortion due to the multi-path phenomenon of the channel. Hence in order to recover the data signal, the inverse channel characteristic needs to be multiplied to the data signal. The estimation of the channel characteristic is called the Channel Estimation. The channel can be estimated at the pilot position because the transmitted pilot signal is known a priori. In the conventional prior art channel estimation, the channel estimates obtained at the pilot positions are interpolated to derive the channel characteristics for the data sub-carriers. From the two-dimensional structure of the scattered pilots in FIG. 3, it is also possible to perform a two-dimensional interpolation, but it is reported that only a small improvement is obtained, let alone the problem of the large memory required to save symbols for the filtering.

In the following, considering this as well as the simplicity of the explanation, the channel estimation is discussed using the pilots within the current symbol only. Extension of the channel estimation to two-dimension is straightforward. In FIG. 3 it is shown that the extracted pilot signals are used to estimate the channel characteristics and equalize the data.

In order to evaluate conventional channel estimation and data equalization, the performance is simulated under the following condition.

Multi-path signals of the following amplitude and phase
  M0 (main signal): Amplitude=1, phase=−π, delay=0
  M1: Amplitude=1/sqrt(2), phase=−π, delay=35 samples
  M2: Amplitude=½, phase=1.2π, delay=40 samples
  M3: Amplitude=1/sqrt (10), phase=−0.4π, delay=50 samples
White noise (AWGN) of C/N=−6 to 12 dB (with respect to the main signal M0) was added to the sum of all the signals defined above
No Doppler shift in the multi-path signals
Max delays of the multi-path signals is within the GI length
OFDM symbol is defined by ISDB-T Mode 1 (2048-FFT) with scatter pilots generated by the specified random code generator (BPSK)
Data are random sequence and every two-bits pair is mapped to each sub-carrier (4 QUAM)
Pilot and data sub-carrier are of the same power
Ideal sampling (no frequency drift between the transmitter and receiver)
Perfect identification of the OFDM symbol boundary.

Figure 4A:
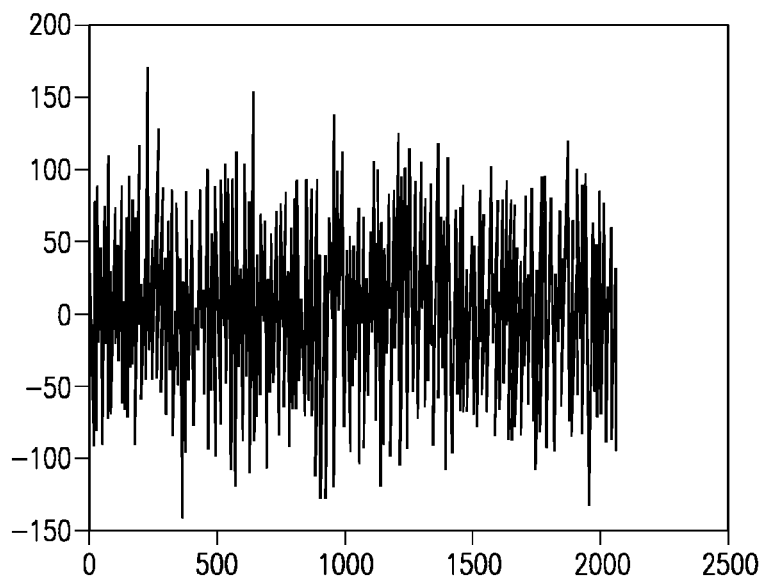
FIG. 4(A) is a plot of amplitude vs. frequency of a received multi-path OFDM signal
Figure 4B:
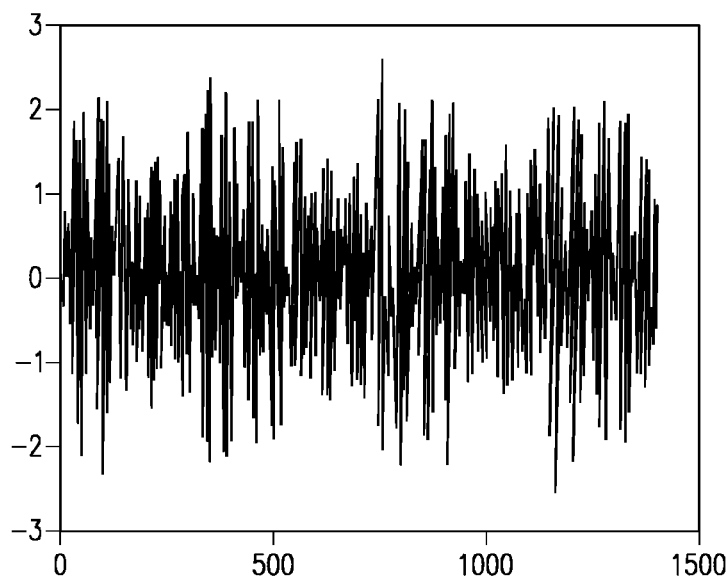
FIG. 4(B) is a plot of amplitude vs. frequency of OFDM sub-carrier signals.

FIG. 4(A) shows an example of the received multi-path generated OFDM signal and FIG. 4(B) its OFDM sub-carrier signals. The amplitude of the sub-carriers needs to be uniform over the entire range. The distortion of the amplitude is caused by the multi-path interference.

Figure 5:
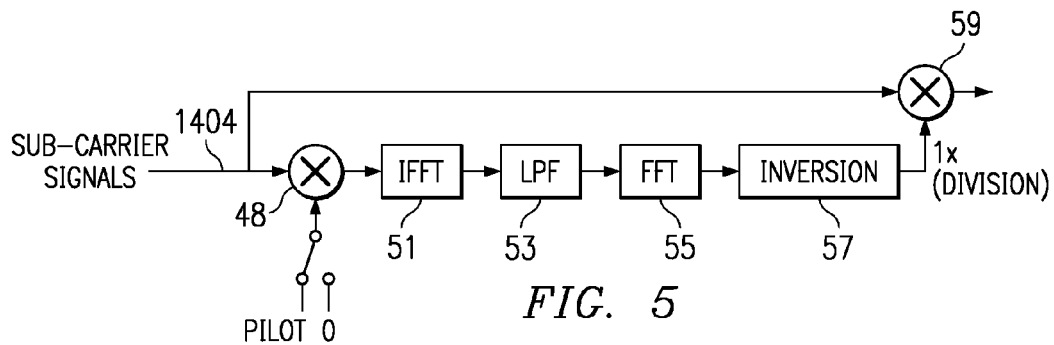
FIG. 5 is a block diagram of an equivalent realization of the conventional multi-path equalization.
Figure 6A:
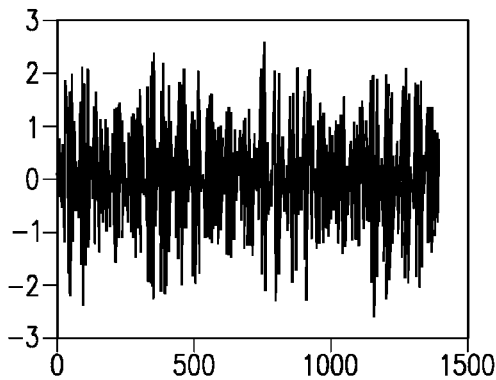
FIG. 6 illustrates channel estimation using scattered pilot signal wherein FIG. 6(*a*) illustrates OFDM subcarrier signals, FIG. 6(*b*) illustrates extracted multi-path profile with aliasing, FIG. 6(*c*) illustrates multi-path profile without aliasing, and FIG. 6(*d*) illustrates estimated channel characteristics.
Figure 6B:
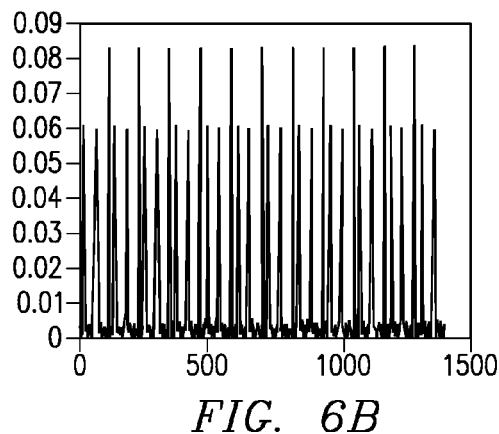
Figure 6C:
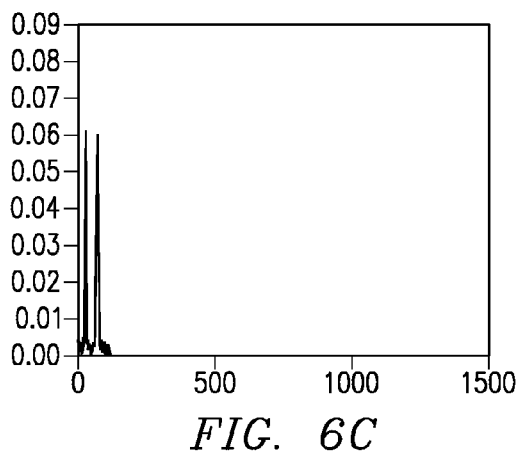
Figure 6D:
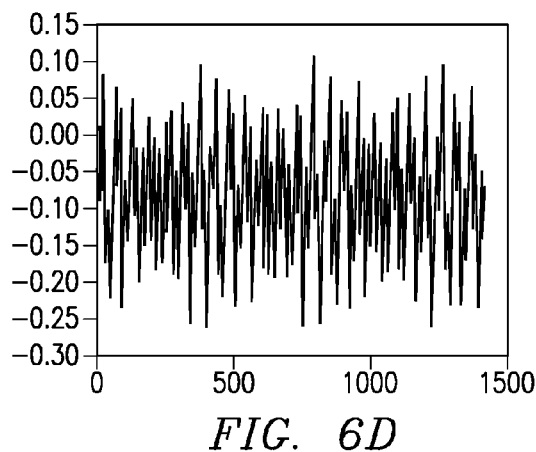

Most of the conventional equalization is based on the estimation of the channel characteristic by interpolating the channel characteristic computed at the pilot signals. See references 1–8 above in the background. This can be equivalently realized in the frequency domain by the equivalent realization of the multi-path equalization as shown in FIG. 5.

From the 2048-FFT outputs from FFT 17 (FIG. 2), the pilot sub-carriers are multiplied at multiplier 49 with the conjugate of the known pilot signals. This aligns the randomly generated pilot signals into '1'. The rest of the sub-carrier signals are forced to be zero by switching to '0' in the FIG. 5. The result is IFFT transformed at FFT 51 to extract the multi-path delay profile. FIG. 6(*b*) shows one such result using the OFDM sub-carrier signals shown in 6(*a*). Due to the zero-forcing at the input of IFFT, a low-pass filtering at LPF 53 needs to be applied to remove the aliasing, which result is shown in FIG. 6(*c*). This is FFT transformed at FFT 55 to provide the desired channel characteristic as shown in FIG. 6(*d*). The equalization to the data signal is achieved by dividing each OFDM sub-carrier by the FFT output (inversion 57 and multiply 59) as shown in FIG. 5.

Figure 7:
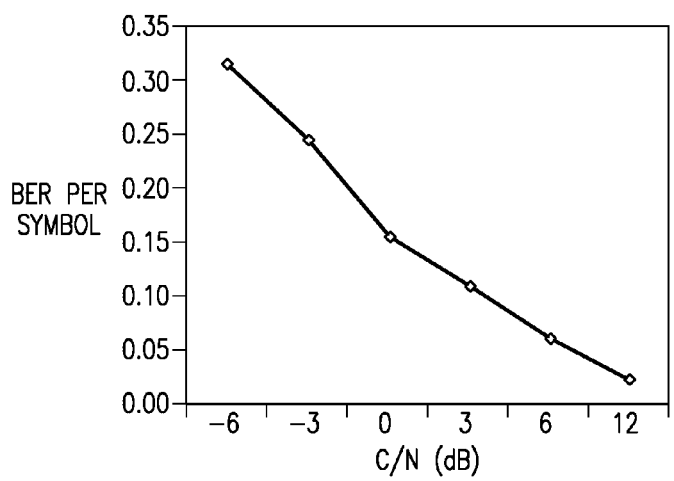
FIG. 7 is a plot of Bit Error Rate (BER) per symbol vs. Carrier to Noise (in dB) performance of the equalization by conventional channel estimation.

The performance of the equalization is discussed in terms of the bit-error rate (BER) of the equalized data signal for different carrier-to-noise (C/N) levels, and is shown in FIG. 7.

Figure 8:
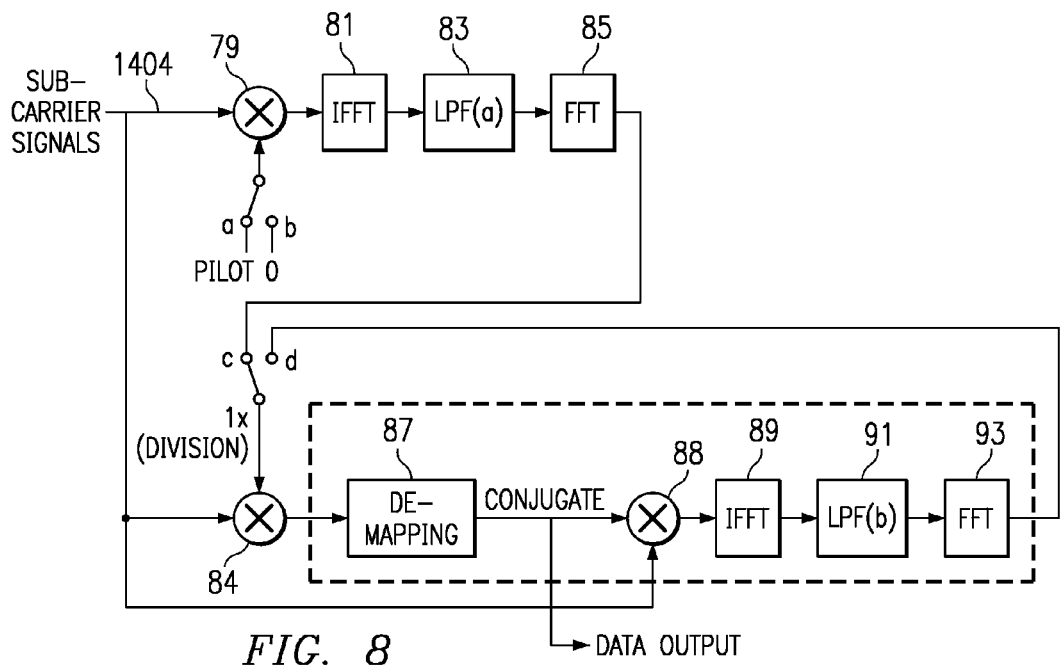
FIG. 8 is a block diagram of multi-path equalization by iterative channel estimation according to one embodiment of the present invention.

In accordance with one embodiment of the present invention a new multi-path equalization is achieved by iterative channel estimation as illustrated in FIG. 8. As explained in FIG. 5, the data signals are not known a priori and hence only the pilot signals are used to estimate the channel characteristic. The pilot subcarriers are multiplied at multiplier 79 with the conjugate of the known pilot signals from terminal 'a' and the rest of the subcarrier signals are forced to be zero by switching to 'b' in FIG. 8. The result is IFFT transformed in IFFT 81 to extract the multi-path delay profile. Due to the zero-forcing at the input of IFFT, a low-pass filtering at LPF(*a*) 83 needs to be applied to remove the aliasing. The output from the low pass filter LPF (*a*) 83 is FFT transformed at FFT 85 to provide the desired channel characteristic. The equalization to the data signal is achieved by dividing at divider 84 each 1404 OFDM subcarrier at 86 with the FFT output from FFT 85. The phase and amplitude correction of the data signal using this channel characteristic recovers the data signals by the de-mapping processing. The de-mapping processing 87 decodes each modulated sub-carrier into a number of bits. For example, each 4-QAM modulated sub-carrier is decoded into two bits. The resulting bits naturally contain some errors because the channel estimation is not perfect. Nonetheless, the recovered data signal can now be used for the channel estimation because the majority of the output bits are considered correct under normal conditions. An improved channel estimation is obtained by multiplying at multiplier 88 the conjugate of the de-mapped data signal from de-mapper 87 to the original input sub-carriers and applying inverse IFFT at IFFT 89, low-pass filtering at LPF (b) 91 and FFT at FFT 93 as shown in the dotted block in FIG. 8. A key point here is to repeat the channel estimation by using the data signal obtained using the previous channel estimate (switch to terminal 'd' to multiplier 84). The output from FFT 93 via terminal 'd' is de-mapped at de-mapper 87 and the a new channel estimation is obtained by multiplying at multiplier 88 the conjugate of the de-mapped signal and the result is applied to the loop comprising the IFFT 89, LPF 91, FFT 93 and via terminal 'd' back to the de-mapper 87. The role of the low pass filter (LPF (b)) is different from that of LPF (a). Firstly, there is no aliasing in the channel estimate this time because all the sub-carriers are used. The noise that is produced in the multi-path profile as the output of IFFT, however, needs to be removed in order to obtain the improved channel estimate. This can be, for example, implemented by suppressing the IFFT outputs smaller than a threshold. This threshold can be adaptively computed from the noise power in the multi-path profile. The threshold is set to remove the noise in the channel estimate. The primary part of the estimated channel characteristics appears at lower frequencies in the IFFT result. The average noise level can be estimated by averaging the IFFT results in the higher frequency (e.g. higher half of the IFFT result). Applying this as a threshold (maybe multiplying it by two in order to remove the noise with higher reliability), a good channel estimate can be obtained. The final output is taken from the output of the de-mapper 87 when the number of feedback loops are sufficient.

Figure 9:
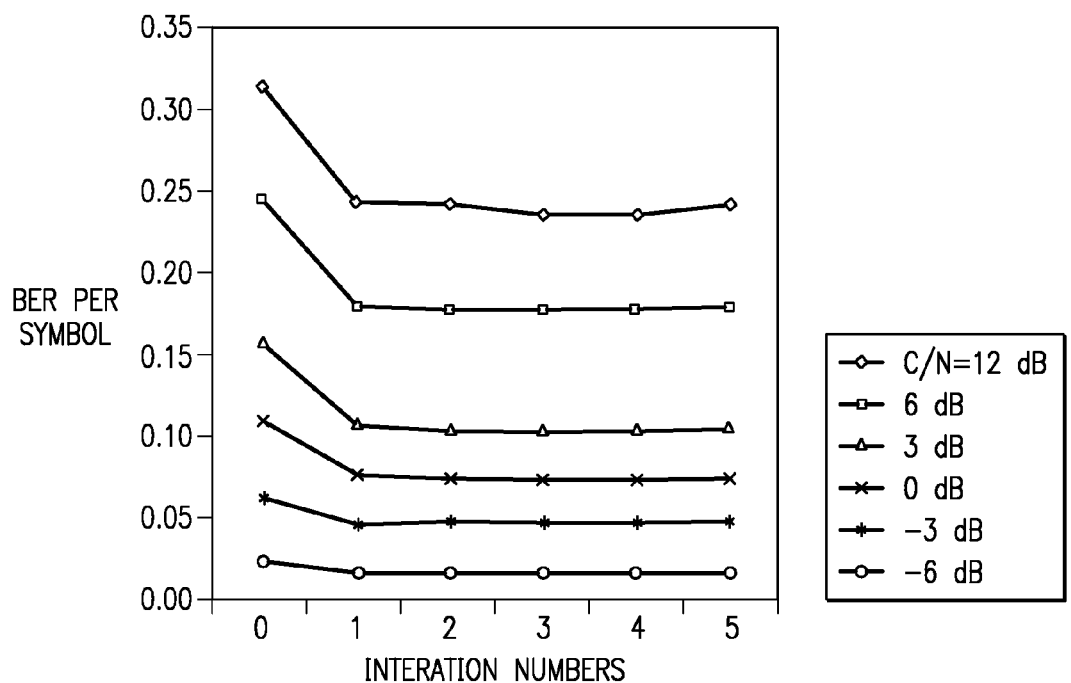
FIG. 9 is a plot of BER per symbol vs. iteration number to illustrate the performance of the multi-path equalization according to the embodiment of FIG. 8.
Figure 10:
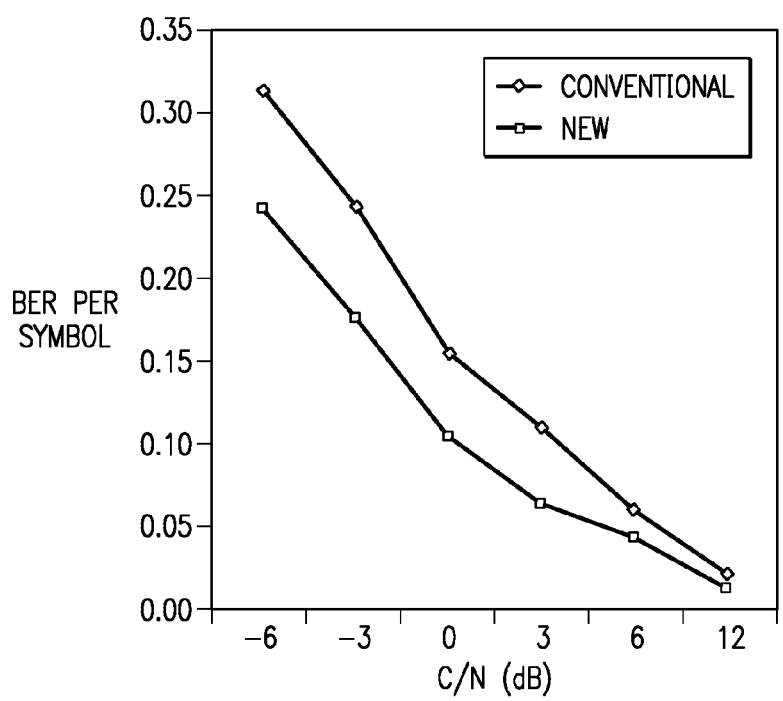
FIG. 10 is a plot of BER per symbol vs. Carrier to Noise (C/N) to show a comparison of the conventional equalization to that according to one embodiment of the present invention. Over 2 dB C/N gain is obtained.
Figure 11:
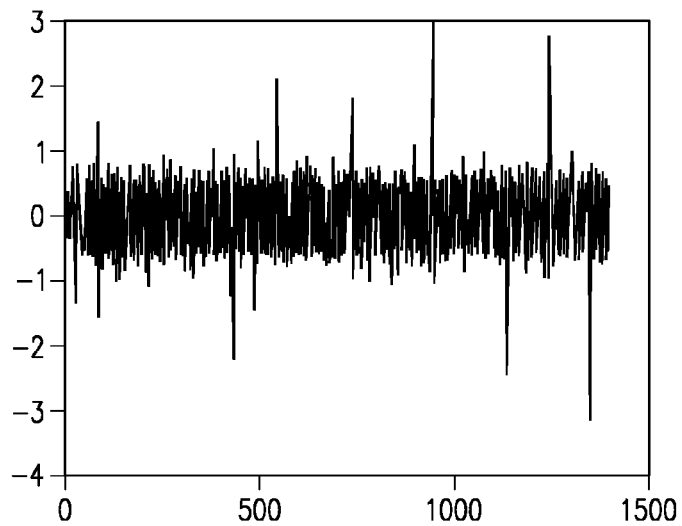
FIG. 11 illustrates equalized OFDM symbol by the embodiment of FIG. 8. (C/N=0 dB)

FIG. 9 shows the improvement of the bit-error-rate (BER) in the output bits (FIG. 8) as the number of the repetition increases for various C/N. It is seen that for the C/N range of −6 to 12 dB, the convergence is fast and for practical applications, one additional feedback seems to be sufficient. FIG. 10 shows the comparison of the performance between the conventional and the new multi-path equalization. Over the C/N range of −6 to 6 dB, over 2 dB gain is achieved. The channel is considered very good for the C/N of over 12 dB, so there is not much improvement. FIG. 11 shows the equalized OFDM symbol. Compared with the original OFDM symbol shown in FIG. 4(*b*), a nearly ideal equalization have been achieved.

Figure 12:
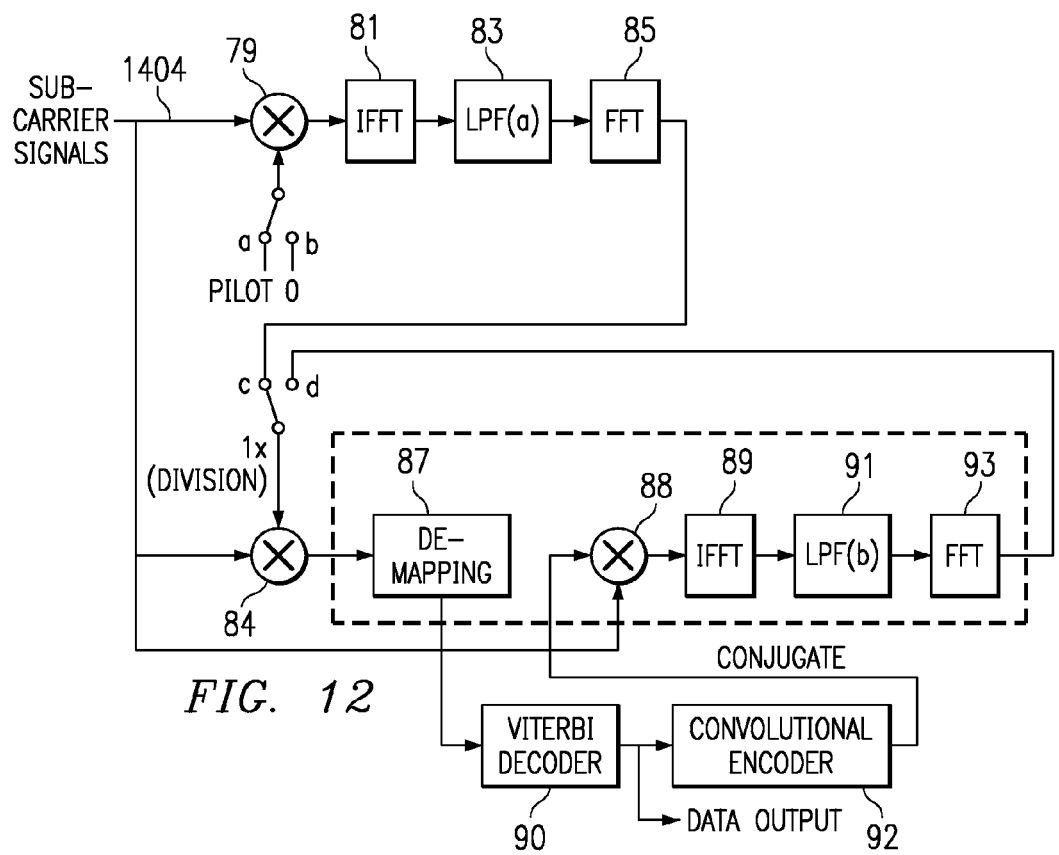
FIG. 12 is a block diagram of a multi-path equalization by iterative channel estimation and including a Viterbi decoder in accordance with a second embodiment of the present invention.

It is also pointed out that ISDB-T and DVB both use the convolutional encoder and the Viterbi decoder for the channel coding. By incorporating the channel decoding within the channel estimation loop as shown in FIG. 12, the performance of the multi-path equalization would be further improved. The improved equalization system in FIG. 12 uses all of the same elements described in connection with FIG. 8 (are identified by the same numbers) with the addition of a Viterbi decoder 90 and convolutional encoder 92 between the de-mapper 87 and the multiplier 88. The data output is taken from the output of the Viterbi decoder.

By considering the multi-path equalization in the frequency domain, a new equalization based on the repeated channel estimation is provided and its performance is shown in terms of bit error rate (BER). For the C/N range of −6 to 6 dB, the equivalent gain of over 2 dB has been shown possible. The noise reduction in the multi-path profile is a key step for the improvement. The incorporation of the channel decoding within the channel estimation loop further improves the performance.

In the claims:

1. A method of multi-path equalization for orthogonal frequency division multiplexing communication system comprising the steps of:
   first estimating the channel characteristic using the pilot signals;
   first dividing each sub-carrier with the channel characteristic to get the equalization of the data signal;
   de-map processing using the phase and amplitude correction of the channel estimate to recover the data signals; and
   repeating channel estimation using conjugate of the data signal obtained using the previous channel estimate;
   repeat dividing each sub-carrier with the new channel characteristic to get the equalization to the data signal; and
   de-map processing to recover the data signals.

2. The method of claim 1 wherein said first estimating step includes the steps of multiplying pilot sub-carriers with the conjugate of the known pilot signals, forcing the rest of the sub-carrier signals to be zero, inverse fast Fourier transform (IFFT) transforming the result to extract the multi-path delay profile, low-pass filtering the IFFT results to remove aliasing, fast Fourier transform (FFT) transforming the filtered output to provide the channel characteristic.

3. The method of claim 2 wherein the repeating step includes multiplying the conjugate of the de-mapped data signal to the input sub-carriers; applying inverse FFT, low pass filtering and FFT transforming the filtered output to get the desired channel characteristic.

4. The method of claim 2 including the step of after de-mapping of Viterbi decoding.

5. The method of claim 4 including the steps of Viterbi decoding and convolutional encoding between de-mapping and multiplying the conjugate of the de-mapped data signal.

6. The method of claim 5 wherein the data output is taken after the Viterbi decoding.

7. The method of claim 1 wherein the data output is taken after de-mapping processing.

8. A multi-path equalization system for orthogonal frequency division multiplexing communication system comprising:
   first means for estimating the channel characteristic using the pilot signals;
   a divider coupled to said estimating means for dividing each sub-carrier with the channel characteristic to get the equalization to the data signal;
   means for de-mapping processing using the phase and amplitude correction of the channel estimate to recover the data signals;
   means coupled to the de-mapping processing for repeating channel estimation using the data signal obtained using the previous channel estimate;
   means for dividing each sub-carrier with new channel characteristic to get new equalization to the data signal; and
   means for de-mapping processing said new equalization to recover the data signals.

9. The system of claim 8 wherein said means for repeating channel estimation includes means for multiplying the conjugate of the de-mapped data signal to the input sub-carriers; applying inverse fast Fourier transform (FFT), low pass filtering, applying fast Fourier transform (FFT).

10. The method of claim 8 wherein said first means for estimating the channel characteristic includes means for multiplying pilot sub-carriers with the conjugate of the known pilot signals, forcing the rest of the sub-carrier signals to be zero, IFFT transforming the result to extract the multi-path delay profile, due to the zero-forcing at the input of IFFT, low-pass filtering the IFFT to remove the aliasing, FFT transforming the filtered output to provide the desired channel characteristic.

11. The system of claim 8 wherein after de-mapping of Viterbi decoding.

12. The system of claim 8 including Viterbi decoding and convolutional encoding between de-mapping and multiplying the conjugate of the de-mapped data signal.

13. A method of multi-path equalization for orthogonal frequency division multiplexing communication system comprising the steps of:
   first estimating the channel characteristic using the pilot signals;
   first dividing each sub-carrier with the channel characteristic to get the equalization of the data signal; de-map processing using the phase and amplitude correction of the channel estimate to recover the data signals; and
   repeating channel estimation using conjugate of the data signal obtained using the previous channel estimate.

14. A method of multi-path equalization for orthogonal frequency division multiplexing communication system comprising the steps of:
   first estimating the channel characteristic using scattered pilot signals inserted between data signals;
   first dividing each sub-carrier with the channel characteristic to get the equalization of the data signal;
   de-map processing to recover the data signals with phase and amplitude correction determined by the channel estimate; and
   repeating channel estimation using the data signal obtained from the previous channel characteristic, dividing each sub-carrier with the channel characteristic to get new equalization of the data signals and de-map processing said new equalization to recover the data signals with phase and amplitude correction determined by the channel estimate until a desired channel estimate is obtained, said new channel estimation is obtained by multiplying the conjugate of the mapped signal to the input sub-carriers, applying the result to inverse FFT, low pass filtering and FFT transforming where the low pass filter threshold is set to suppress the inverse FFT outputs small than a threshold to remove noise in the channel estimate.

15. The method of claim 14, wherein said first estimating step includes the steps of multiplying pilot sub-carriers with the conjugate of the known pilot signs, forcing the rest of the sub-carrier signals to be zero, inverse fast Fourier transform (IFFT) transforming the result to extract the multi-path delay profile, low pass filtering the IFFT result to remove aliasing, fast Fourier transform (FFT) transforming the filtered output to provide the first channel characteristics.

16. The method of claim 14 including the steps of Viterbi decoding and convolutional encoding between de-mapping and multiplying the conjugate of the de-mapped data signal.

17. The method of claim 15 including the steps of Viterbi decoding and convolutional encoding between de-mapping and multiplying the conjugate of the de-mapped data signal.

18. A multi-path equalization system for orthogonal frequency division multiplexing communication system comprising:
   first means for first estimating the channel characteristic using scattered pilot signals;
   first divider coupled to said first estimating means for dividing each sub-carrier with the channel characteristic to get the equalization of the data signals;
   means for de-map processing to recover the data signals with phase and amplitude correction determined by the channel estimate;
   means coupled to the de-map processing for repeating channel estimation using the data signal obtained from the previous channel characteristic, dividing each sub-carrier with the channel characteristic to get new equalization of the data signals and de-map processing said new equalization to recover the data signals with phase and amplitude correction determined by the channel estimate until a desired channel estimate is obtained, said new channel estimation is obtained by multiplying the conjugate of the de-mapped signal to the input sub-carriers, applying the result to inverse FFT, low pass filtering and FFT transforming where the low pass filter threshold is set to suppress the inverse FFT outputs smaller than a threshold to remove noise in the channel estimate.

19. The system of claim 18, whereins aid first means for estimating the channel characteristic includes means for multiplying pilot sub-carriers with the inverse fast Fourier transform (IFFT) transforming the result to extract the multi-path delay profile, low pass filtering the IFFT results to remove aliasing, fast Fourier transform (FFT) transforming the filtered output to provide the first channel characteristic.

20. The system of claim 18, further including Viterbi decoding and convolutional encoding between de-mapping and multiplying the conjugate of the de-mapped data signal.

21. The system of claim 19, further including Viterbi decoding and convolutional encoding between de-mapping and multiplying the conjugate of the de-mapped data signal.

* * * * *